(12) United States Patent
Clark, Jr. et al.

(10) Patent No.: US 7,562,458 B1
(45) Date of Patent: Jul. 21, 2009

(54) DEVICE TO REDUCE THE INCIDENCE OF ASPIRATION

(76) Inventors: Robert Louis Clark, Jr., 8275 NW. 54th Ave., Johnston, IA (US) 50131; Michael David Johnson, 513 High Ridge Dr., Friendswood, TX (US) 77546

( * ) Notice: Subject to any disclaimer, the term of this patent is extended or adjusted under 35 U.S.C. 154(b) by 429 days.

(21) Appl. No.: 11/401,162

(22) Filed: Apr. 10, 2006

Related U.S. Application Data

(60) Provisional application No. 60/670,842, filed on Apr. 13, 2005.

(51) Int. Cl.
*A61B 5/103* (2006.01)
*A61G 7/002* (2006.01)

(52) U.S. Cl. .................. 33/333; 33/512; 33/366.11; 5/617; 5/618; 5/424; 340/573.1; 340/689

(58) Field of Classification Search .................. 33/333, 33/511, 512, 348, 354, 366.11, 366.15, 366.24, 33/391, 396, 397, 399, 1 PT, 534, 365; 5/617, 5/618, 424; 340/573.1, 573.7, 689
See application file for complete search history.

(56) References Cited

U.S. PATENT DOCUMENTS

| | | | |
|---|---|---|---|
| 466,380 A | | 1/1892 | Spencer |
| 559,090 A | | 4/1896 | West |
| 3,233,235 A | * | 2/1966 | Wright ..................... 33/366.24 |
| 3,806,109 A | | 4/1974 | Weber et al. |
| 3,861,052 A | * | 1/1975 | Siegfried ................. 33/366.26 |
| 4,102,055 A | | 7/1978 | Volk, Jr. |
| 4,205,665 A | | 6/1980 | Burton |
| 4,769,584 A | * | 9/1988 | Irigoyen et al. ............. 318/648 |
| 5,058,283 A | * | 10/1991 | Wise et al. .................... 33/371 |
| 5,144,823 A | | 9/1992 | Wood |
| 5,157,842 A | | 10/1992 | Swanda |
| 5,205,004 A | | 4/1993 | Hayes et al. |
| 5,611,096 A | | 3/1997 | Bartlett et al. |
| 5,715,548 A | | 2/1998 | Weismiller et al. |
| 5,740,881 A | * | 4/1998 | Lensak ........................ 182/18 |

(Continued)

OTHER PUBLICATIONS

Torres, et al., Pulmonary Aspiration of Gastric Contents in Patients Receiving Mechanical Ventilation: The Effect of Body Position, Ann. of Int. Med., Apr. 1, 1992 pp. 540-543, vol. 16, No. 7.

(Continued)

*Primary Examiner*—Amy Cohen Johnson
(74) *Attorney, Agent, or Firm*—Hulsey IP Intellectual Property Lawyers, P.C.

(57) ABSTRACT

The invention relates to a form of a passive or active annunciator that solves the problem of reminding a caregiver to reposition a patient at risk for aspiration usually located in an adjustable bed to some predetermined angular position. The annunciator may take the form of an inclinometer (100) that measures the angle of the bed (160) relative to a local gravity reference or a goniometer that measures the angle between the horizontal (140) and elevated portions (130) of the bed. The invention reminds the caregiver of the patient at risk for aspiration to maintain or reestablish the elevation of the torso of the patient at risk for aspiration to at least 30 degrees up to 45 degrees above the local horizontal to prevent or reduce the incidence of aspiration.

15 Claims, 8 Drawing Sheets

U.S. PATENT DOCUMENTS

| | | | |
|---|---|---|---|
| 5,822,813 A | 10/1998 | Powell | |
| 5,956,855 A * | 9/1999 | Foss et al. | 33/391 |
| 6,182,310 B1 | 2/2001 | Weismiller et al. | |
| 6,279,183 B1 * | 8/2001 | Kummer et al. | 5/600 |
| 6,353,949 B1 | 3/2002 | Falbo | |
| 6,353,950 B1 | 3/2002 | Bartlett et al. | |
| 6,356,203 B1 | 3/2002 | Halleck et al. | |
| 6,392,556 B2 * | 5/2002 | Tomich | 340/689 |
| 6,397,716 B1 | 6/2002 | Garuglieri | |
| 6,505,365 B1 | 1/2003 | Hanson et al. | |
| 6,836,972 B2 * | 1/2005 | Drahos et al. | 33/366.11 |
| 6,890,312 B1 * | 5/2005 | Priester et al. | 600/595 |
| 6,986,180 B1 * | 1/2006 | Wilke | 5/618 |
| 7,117,607 B2 * | 10/2006 | Horgan | 33/366.11 |
| 7,319,386 B2 * | 1/2008 | Collins et al. | 340/539.12 |
| 7,346,944 B2 * | 3/2008 | Shaw | 5/616 |
| 7,487,562 B2 | 2/2009 | Frondorf et al. | |
| 2007/0044237 A1 * | 3/2007 | Williams | 5/613 |

OTHER PUBLICATIONS

Drakulovic, et al., Supine Position as a Risk Factor for Nosocomial Pneumonia in Mechanically Ventilated Patients: A Randomized Trial, The Lancet, Nov. 27, 1999, pp. 1851-1858, vol. 354.

Webster, Importance of Position in Which Patients Are Nursed in Intensive Care Units, The Lancet, Nov. 27, 1999, pp. 1865-1836, vol. 354.

Grap, et al., Predictions of Backrest Elevation in Critical Care, Intensive Care and Nursing, 2003, pp. 68-74, vol. 19.

\* cited by examiner

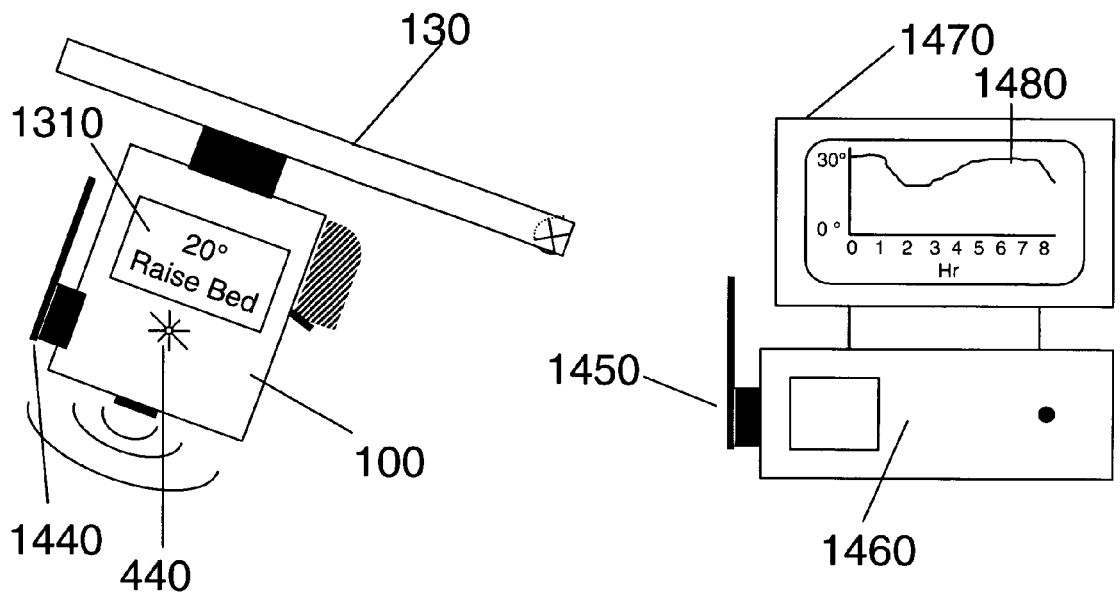
Figure 14
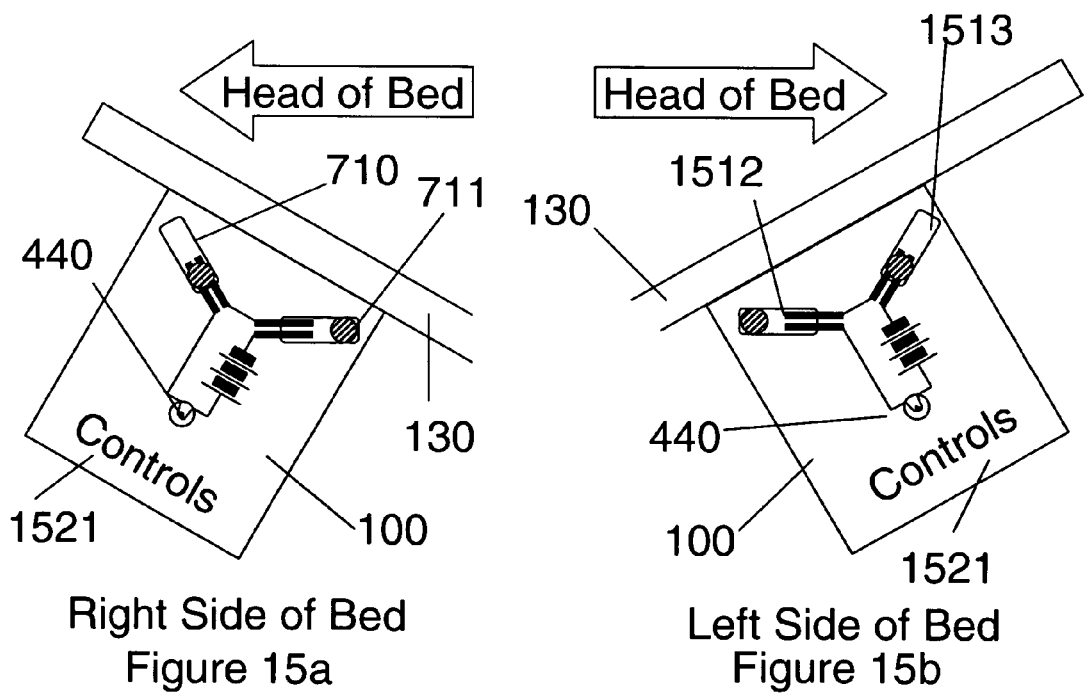
Right Side of Bed
Figure 15a
Left Side of Bed
Figure 15b

DEVICE TO REDUCE THE INCIDENCE OF ASPIRATION

CROSS-REFERENCE TO RELATED APPLICATIONS

This application claims the benefit of provisional patent application Ser. No. 60/670,842, filed 2005 Apr. 13 by the present inventors.

FEDERALLY SPONSORED RESEARCH

Not Applicable

SEQUENCE LISTING OR PROGRAM

Not Applicable

BACKGROUND OF THE INVENTION

1. Field Of Invention

This invention relates generally to a device to reduce the incidence of aspiration into lungs of humans and specifically to an angle measuring device that reminds patient caregivers to elevate an upper torso of a patient at risk for aspiration.

2. Prior Art

Current standards of patient care require that patients at risk for aspiration pneumonia (i.e. pneumonia caused by aspiration of a liquid or solid into the lungs) have their upper torsos elevated at least 30 degrees up to 45 degrees above the local horizontal to prevent or reduce the incidence of aspiration of gastric contents or other liquids or solids into the patient's lungs (hereafter referred to as "aspiration"). This standard could be modified in the future. Examples of patients at risk for aspiration would include: patients on mechanical ventilators, patients with feeding tubes, patients who have had strokes, and any patient with diminished mentation. Treatment studies have shown this degree of elevation significantly reduces the incidence of aspiration pneumonia.

Elevation of the patient is usually accomplished by raising the head of the bed the required 30 to 45 degrees. Various patient care activities (e.g. bathing, changing bed sheets, changing wound dressings, etc.) may require that the patient be restored to a supine position for short periods to perform the required care. In many cases, the restoration of the required 30 to 45 degrees elevation is not accomplished due to some form of distraction to the caregiver. The supine patient remains at increased risk for aspiration, which could lead to pneumonia, respiratory arrest, and even death. This problem could be readily solved by the utilization of some form of a device reminding the caregiver to reposition and maintain the patient at the required 30 to 45 degree upper torso elevation.

Prior art methods of reminding caregivers to maintain the elevation of the patient's torso to reduce the risk of aspiration have been in the form of training programs and posters intended to instill diligence in caregivers. Unfortunately, these methods are not active in nature and rely on the memory of humans to implement.

Prior art methods of utilizing active devices to remind people to perform a function have been very successful. For example, in modern automobiles an audio alarm will sound if a driver of an automobile forgets to remove their keys from the ignition switch after the automobile is turned off and the driver's door is opened. The alarm alerts the driver to remove the keys from the ignition switch to prevent the driver from unintentionally locking the keys in the automobile.

Prior art beds are known to incorporate various angle measuring devices, for example, a goniometer at the joint of a horizontal and elevated portion of a bed. Such devices have not heretofore been known to specifically neither indicate the proper elevation of the torso of the patient at risk for aspiration nor give any indication, passive or active, to the caregiver of the bed being outside of the desired 30 to 45 degree torso elevation to prevent or reduce the incidence of aspiration.

Prior art inclinometers, for example U.S. Pat. No. 559,090 to West (1896), indicate angles directly. This unit is accurate and very inexpensive to construct but fails to utilize a proper scale or indicating device to remind the caregiver to elevate the head of the bed to the specified angular range to reduce the risk of aspiration.

Another example in the prior art is U.S. Pat. No. 5,144,823 to Wood (1992). This pipe bending device utilizes an active aural and visual alarm that indicates to a user when a predetermined angle has been reached while bending a pipe or conduit. This unit utilizes an active, adjustable electrical tilt switch that causes an alarm to sound upon the unit reaching a preset angle and also utilizes a removable attachment fixture to the pipe. This unit fails to utilize the proper scale or indicating device to remind the caregiver to elevate the head of the bed to the specified angular range to reduce the risk of aspiration.

Another example in the prior art is U.S. Pat. No. 6,182,310 to Weismiller, et. al. (2001). This bed side rail incorporates a ball-in-tube inclinometer into the bed side rail. This unit simply indicates the elevation angle of the bed and is visible on only one side of the bed unless two units are incorporated into side rails on either side of the bed. This unit fails to utilize the proper scale or indicating device to remind the caregiver to elevate the head of the bed to the specified angular range to reduce the risk of aspiration.

Prior art goniometers, for example U.S. Pat. No. 6,505,365 B1 to Hanson, et. al. (2003), measure and indicate angles directly. In this instance the goniometer functions as a knee elevation angle indicator. This unit fails to utilize the proper scale or indicating device to remind the caregiver to elevate the head of the bed to the specified angular range to reduce the risk of aspiration.

OBJECTS AND ADVANTAGES

Accordingly, besides the objects and advantages of the angle measuring devices described in our above patent, several objects and advantages of the present invention are:

(a) to provide a form of passive or active annunciator that solves the problem of reminding the caregiver to reposition the patient at risk for aspiration usually located in an adjustable bed, cart, chair or gurney (heretofore referred to as a bed) to some predetermined angular position. The annunciator may take the form of an inclinometer that measures the angle of the bed relative to a local gravity reference. Thus, the device solves the problem of reminding the caregiver of the patient at risk for aspiration to maintain or reestablish the elevation of the torso of the patient at risk for aspiration to at least 30 degrees up to 45 degrees above the local horizontal to prevent or reduce the incidence of aspiration.

(b) to provide a form of passive or active annunciator that solves the previously cited problem by taking the form of a goniometer to measure the angle of the elevated portion of the bed relative to the horizontal portion of the bed while operating under the assumption that the bed is situated on a level surface.

(c) to provide a form of inclinometer or goniometer that solves the previously cited problem by utilizing a passive visual indicating device to indicate the proper or improper elevation of the torso of the patient at risk for aspiration.

(d) to provide a form of inclinometer or goniometer that solves the previously cited problem by utilizing an active visual indicating device to indicate the proper or improper elevation of the torso of the patient at risk for aspiration.

(e) to provide a form of inclinometer or goniometer that solves the previously cited problem by utilizing an active aural indicating device to indicate the proper or improper elevation of the torso of the patient at risk for aspiration.

(f) to provide a form of inclinometer or goniometer that solves the previously cited problem by utilizing a timing device capable of providing a predetermined delay of the indication of the proper or improper elevation of the torso of the patient at risk for aspiration.

(g) to provide a form of inclinometer or goniometer that solves the previously cited problem by utilizing an electronic or electrical sensor or switch capable of sensing the proper or improper elevation of the torso of the patient at risk for aspiration.

(h) to provide a form of inclinometer or goniometer that solves the previously cited problem by utilizing an electrical power supply consisting of a cell, battery or capacitor.

(i) to provide a form of inclinometer or goniometer that solves the previously cited problem by utilizing an electrical power supply consisting of a mains power source.

(j) to provide a form of inclinometer or goniometer that includes an electrical power supply switch capable of preventing unintentional power down of the device.

(k) to provide a form of inclinometer or goniometer that includes a permanent system of attachment to the bed.

(l) to provide a form of inclinometer or goniometer that includes a non-permanent system of attachment to the bed.

(m) to provide a form of inclinometer or goniometer that includes a system to record and view data of the elevation state of the bed over a given period of time.

(n) to provide a form of inclinometer or goniometer that includes a system to electronically transmit data to a computer via cable, network, storage media or wirelessly the elevation state of the bed over a given period of time.

(o) to provide a form of inclinometer or goniometer that includes a system to place the inclinometer or goniometer on either side of the bed parallel to the long axis of the bed that permits the inclinometer or goniometer to function properly.

Still further objects and advantages will become apparent from a consideration of the ensuing description and drawings.

SUMMARY

In accordance with the present invention an angle measuring device is comprised of an inclinometer or goniometer having indicia, visual and aural indicators that annunciate the proper or improper elevation of the upper torso of the patient at risk for aspiration.

DRAWINGS

Figures

In the drawings, closely related figures have the same number but different alphabetic suffixes.

FIG. 14 shows a view of one embodiment of the invention in the form of an inclinometer utilizing a system to electronically transfer data to a computer via cable, network, storage media or wirelessly the elevation state of the bed over a given period of time.

FIGS. 15a and 15b show views of one embodiment of the invention in the form of an inclinometer utilizing a system to place the inclinometer on either side of the bed parallel to the long axis of the bed that permits the inclinometer to function properly.

DRAWINGS - Reference Numerals

| | | | |
|---|---|---|---|
| 100 | inclinometer housing | 110 | transparent arcuate assembly |
| 120 | ball bearing | 130 | moveable portion of bed |
| 140 | stationary portion of bed | 150 | triangle (descriptive geometry) |
| 160 | elevation angle | 170 | local horizontal line |
| 200 | goniometer body | 210 | goniometer indicator face |
| 220 | goniometer pointer | 340 | >45 degree indicator zone |
| 350 | 30 to 45 degree indicator zone | 360 | <30 degree indicator zone |
| 370 | arcuate assembly fastener | 440 | indicator light |
| 520 | active aural indicating device | 540 | audio tone |
| 610 | activated device | 710 | mercury tilt switch |
| 711 | tilt switch > 30 degrees | 713 | tilt switch < 30 degrees |
| 714 | MEMS accelerometer > 30 degrees | 715 | MEMS accelerometer < 30 degrees |
| 840 | battery | 940 | mains power cord and plug |
| 1040 | toggle switch in off position | 1041 | toggle switch in on position |
| 1050 | switch cover in open position | 1051 | switch cover in closed position |
| 1150 | goniometer pointer fasteners | 1160 | goniometer body fasteners |
| 1240 | magnet | 1310 | alphanumeric indicator |
| 1340 | removable memory card | 1440 | transmitting antenna |
| 1450 | receiving antenna | 1460 | computer |
| 1470 | computer monitor | 1480 | data graph |
| 1512 | active mercury tilt switch (left side of bed) | 1513 | inactive mercury tilt switch (left side of bed) |
| 1521 | control word orientation | | |

DETAILED DESCRIPTION

Figure 1:
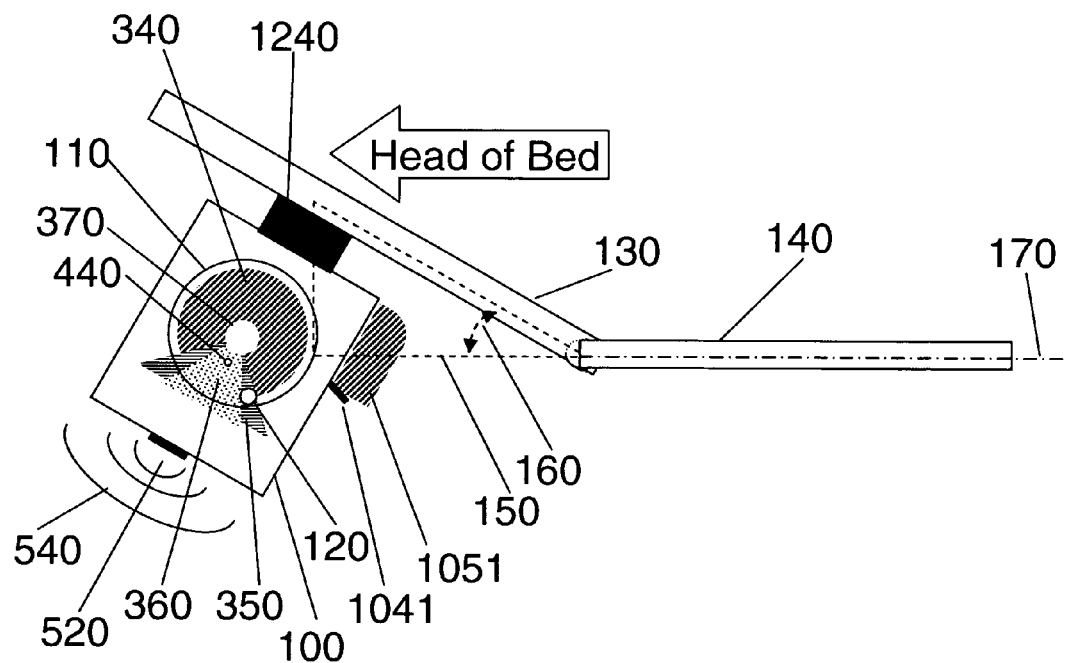
FIG. 1 shows a view of a preferred embodiment of the invention in the form of an inclinometer.

FIG. 1—Preferred Embodiment

Referring to FIG. 1, a preferred embodiment of the invention in the form of an inclinometer includes an annunciator that is preset to indicate the required angular positioning boundaries of the patient. Inclinometer 100 is attached to the upper movable portion or head of a bed 130. The bed also has a stationary horizontal portion 140. Local horizontal is indicated by a broken line 170. Inclinometer 100 includes a transparent arcuate assembly 110 containing a ball bearing 120 that tracks local vertical (i.e. vertical edge of a triangle 150) and functions as an angle measuring means. Appropriate angular ranges 160 of the upper portion of bed 130 that reduces aspiration in the patient are indicated on the face of inclinometer 100. Assuming the patient's torso is properly placed on head of bed 130, angle 160 represents the actual angle of the patient's torso elevation above local horizontal 170. Thus, inclinometer 100 functions as a torso angle measuring device. A fastener 370 holds transparent arcuate assembly 110 to inclinometer 100 face. Inclinometer 100 is attached to head of bed 130 utilizing a non-permanent system 1240 in the form of a permanent magnet. Passive angular indicators 340, 350 and 360 on the face of inclinometer 100 indicate appropriate angular ranges of the upper portion of bed 130 that reduce the incidence of aspiration in the patient and function as angle indicating means. An active angular indicator light 440 on the face of inclinometer 100 flashes when the inappropriate angular range of the upper portion of bed 130 is reached. An active aural indicating device 520 on the face of inclinometer 100 emits a tone 540 when the inappropriate angular range of the upper portion of bed 130 is reached. A timer circuit may also be employed to delay the activation of aural indicating device 520 or indicator light 440 after a predetermined time to provide a caretaker with adequate time to perform required patient care at the reduced angular position of head of bed 130. Both indicator light 440 and aural indicating device 520 function as angle indicating means. Power to the unit is controlled by toggle switch 1041 and is covered with a switch cover 1051 to prevent unintentional powering off of the unit.

Operation

FIG. 1

In operation of the invention inclinometer 100 is powered on by moving toggle switch 1041 to the "on" position and closing switch cover 1051 to prevent unintentional powering off of the unit. Inclinometer 100 is attached to a parallel surface on head of bed 130 via magnet 1240 on, for example, a steel frame. The caretaker may then observe the position of ball 120. For example, if ball 120 is in area 360, the angular range of the bed is below 30 degrees, i.e. this may be dangerous to the patient. If ball 120 is in this region angular indicator light 440 will flash and aural indicating device 520 will emit signal tone 540 to alert the caretaker of the dangerous situation. If ball 120 is in region 350, the angular range of the bed is between 30 degrees and 45 degrees and is safe for the patient. Angular indicator light 440 will not flash and aural indicating device 520 will not emit signal tone 540 in this state. If ball 120 is in area 340, the head of the bed may be too high for the comfort of the patient but is still safe. Angular indicator light 440 will not flash and aural indicating device 520 will not emit signal tone 540 in this state.

FIGS. 2-15

Additional Embodiments

Figure 2:
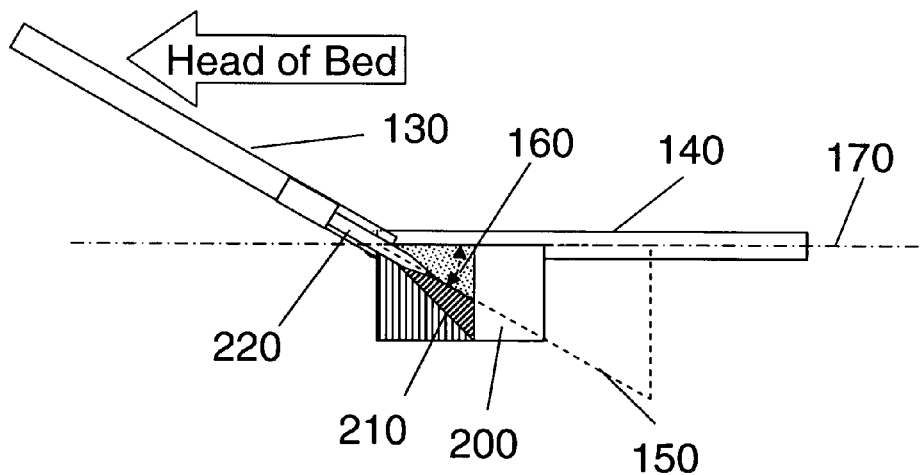
FIG. 2 shows a view of one embodiment of the invention in the form of a goniometer.

Referring to FIG. 2, a second embodiment of the invention in the form of a goniometer includes an annunciator that is preset to indicate the required angular positioning boundaries of the patient. Goniometer 200 is attached to the lower portion or foot of bed 140. The bed also has a moveable upper portion or head 130. Local horizontal is indicated by broken line 170. It is assumed that broken line 170 is perpendicular to the local gravity vertical. Angle range indicator 210 in combination with pointer 220 indicates the angle of the upper portion of bed 130 (i.e. angle 160 in triangle 150) and functions as goniometer 200. Other methods of measuring the angle of head of bed 130 could utilize an existing angle measuring device on the bed coupled with an attached scale that indicates the proper elevation of head of bed 130. Appropriate angular ranges 160 of the upper portion of bed 130 that reduce aspiration in the patient are indicated on the face of goniometer 200.

Figure 3:
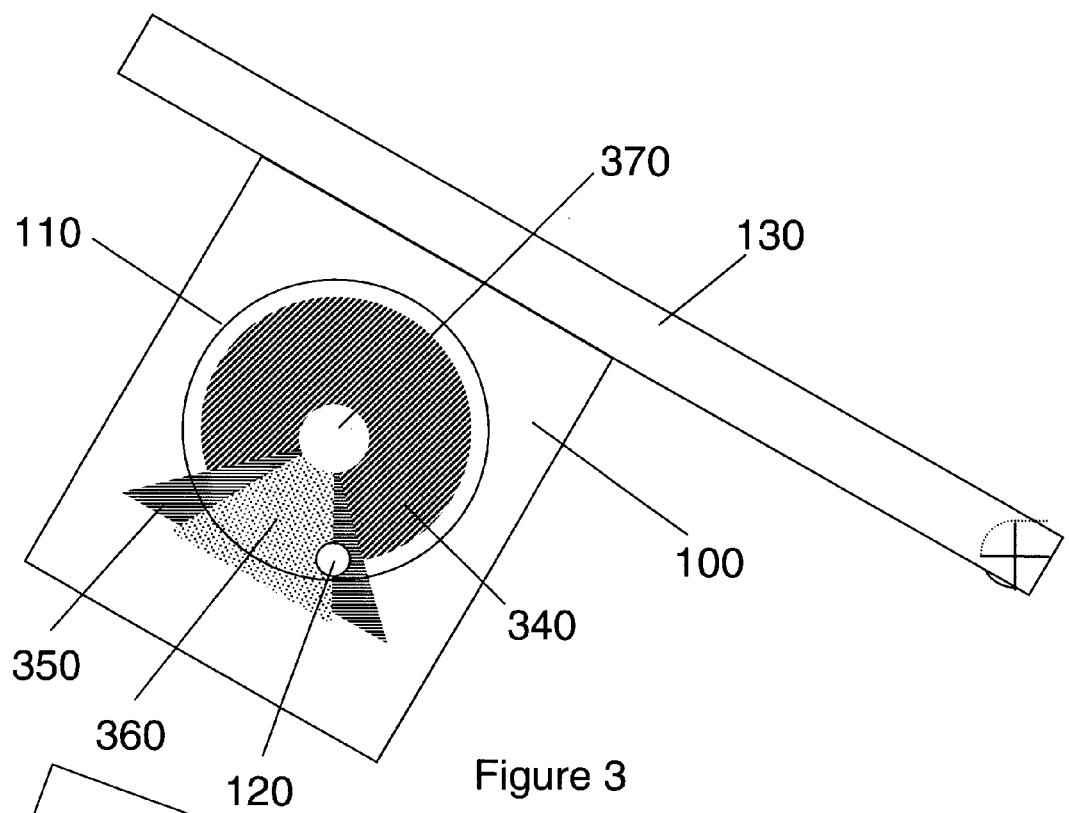
FIG. 3 shows a view of one embodiment of the invention in the form of an inclinometer utilizing a passive visual indicating device.

Referring to FIG. 3, a third embodiment of the invention in the form of the inclinometer utilizing a passive visual indicating device includes various indicators to indicate wither the unit is in or out of angular compliance, the operational status of the unit (e.g. battery condition or power switch position), and actual angle of the device or other data parameters of the device. The passive angle indication method may comprise of a needle indicator, colored windows, passive bubble (i.e. spirit level) level, floating indicator level, a manometer tube set, a pendulous (e.g. plumb bob) mass, a ball on an arcuate surface (e.g. ball in tube) or any other known method of indicating the desired elevation of the patient's upper torso including the use of a goniometer. FIG. 3 shows inclinometer 100 with ball 120 in transparent arcuate assembly 110. Ball 120 tracks the local vertical. Fastener 370 holds transparent arcuate assembly 110 to inclinometer 100 face. Inclinometer 100 is fastened to the upper moveable portion of bed 130. Passive angular indicators 340, 350 and 360 on the face of inclinometer 100 indicate the appropriate angular ranges of the upper portion of bed 130 that reduce aspiration in the patient are indicated on the face of inclinometer 100. For example, if ball 120 is in area 360, the angular range of the bed is below 30 degrees, i.e. this may be dangerous to the patient. If ball 120 is in region 350, the angular range of the bed is between 30 degrees and 45 degrees and is safe for the patient. If ball 120 is in area 340, the head of the bed may be too high for the comfort of the patient but is still safe. The intent is not to limit the invention to any one type or use of passive visual indicating device.

Figure 4:
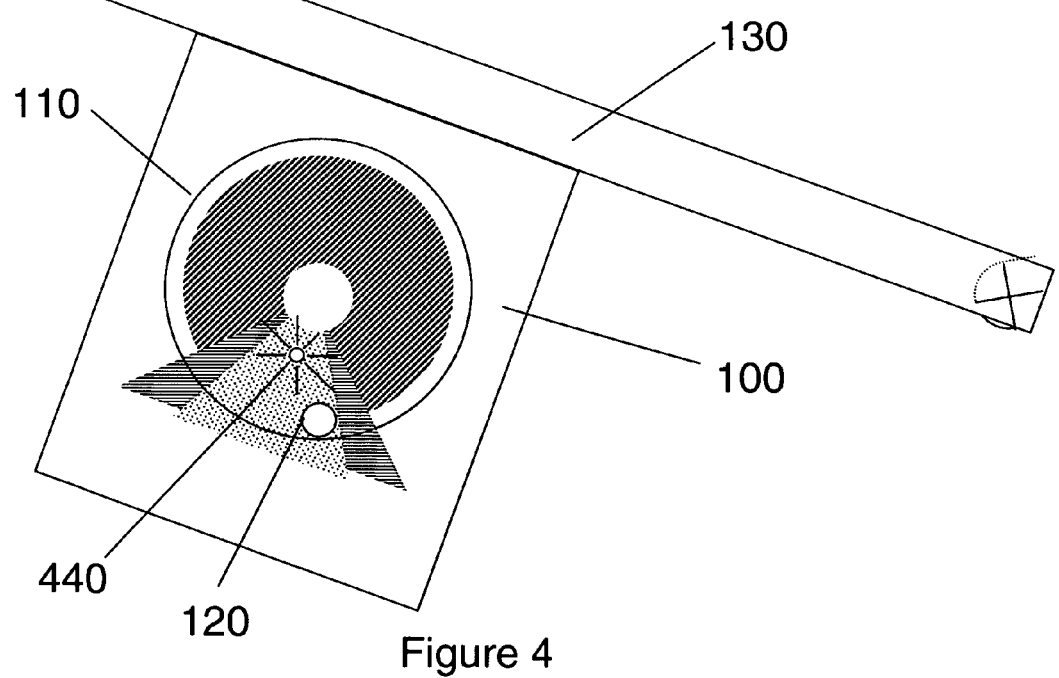
FIG. 4 shows a view of one embodiment of the invention in the form of an inclinometer utilizing an active visual indicating device.

Referring to FIG. 4, a fourth embodiment of the invention in the form of the inclinometer utilizing an active visual indicating device includes various signal lights or alphanumeric displays (e.g. incandescent light, light emitting diode, laser, IR LED, OLED, electro luminescent panel, fluorescent lamp, LCD or any other known light emitting or light altering method) operating in various modes (e.g. continuously on or flashing) to indicate wither the unit is in or out of angular compliance, elapsed time in or out of angular compliance, the operational status of the unit (e.g. battery condition or power state), actual angle of the device or other data parameters of the device including the application to the goniometer version. FIG. 4 shows inclinometer 100 with ball 120 in transparent arcuate assembly 110. Ball 120 tracks the local vertical. Inclinometer 100 is fastened to the upper moveable portion of bed 130. Active angular indicator light 440 on the face of inclinometer 100 flashes when the inappropriate angular range of the upper portion of bed 130 is reached. For example, if the angular range of the bed is below 30 degrees, i.e. this may be dangerous to the patient; active indicator light 440 will flash. If the angular range of the bed is above 30 degrees, this is safe for the patient and active indicator light 440 will extinguish. The intent is not to limit the invention to any one type or use of active visual indicating device.

Figure 5:
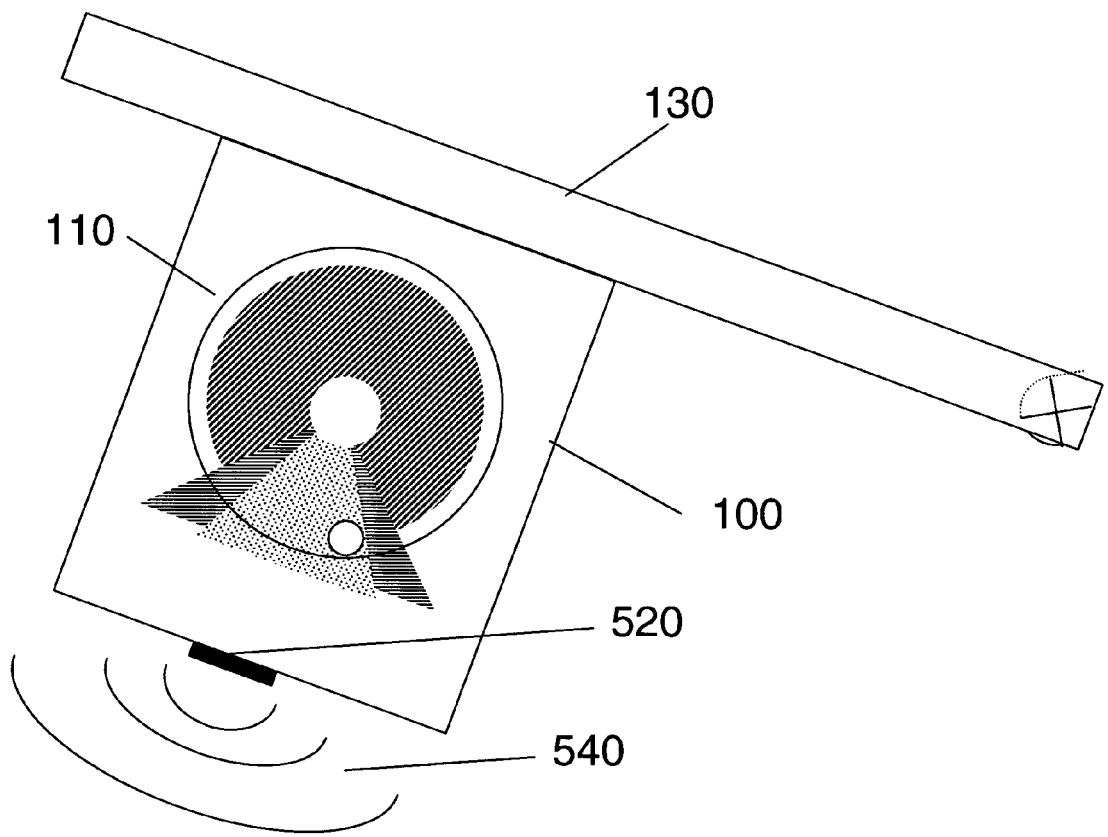
FIG. 5 shows a view of one embodiment of the invention in the form of an inclinometer utilizing an active aural indicating device.

Referring to FIG. 5, a fifth embodiment of the invention in the form of the inclinometer utilizing an active aural indicating device includes an audio annunciator that may be preset to indicate the proper or improper angular positioning boundaries. Aural annunciator may emit a continuous, variable, Morse-code or staccato-like frequency or amplitude varying sound that ensures distinction from other devices that may have similar sounding alarms. The device may also utilize a prerecorded voice message (e.g. "Please raise head of the bed") to perform the annunciation function. Aural indicator can also be used to indicate the operating status of the unit or other data parameters of the device. For example, a low battery chirper may be used to indicate the charge state of a battery or a chirp could indicate that the unit is at the proper angle while the caregiver is elevating the bed. FIG. 5 shows inclinometer 100 with a ball in transparent arcuate assembly 110. Inclinometer 100 is fastened to the upper moveable portion of bed 130. Active aural indicating device 520 on the face of inclinometer 100 emits tone 540 when the inappropriate angular range of the upper portion of bed 130 is reached. For example, if the angular range of the bed is below 30 degrees, i.e. this may be dangerous to the patient; active aural indicating device 520 will sound. If the angular range of the bed is above 30 degrees, this is safe for the patient and active aural indicating device 520 will stop alarming. Similar configurations could be applied to the goniometer version. The intent is not to limit the invention to any one type or use of active aural indicating device.

Figure 6:
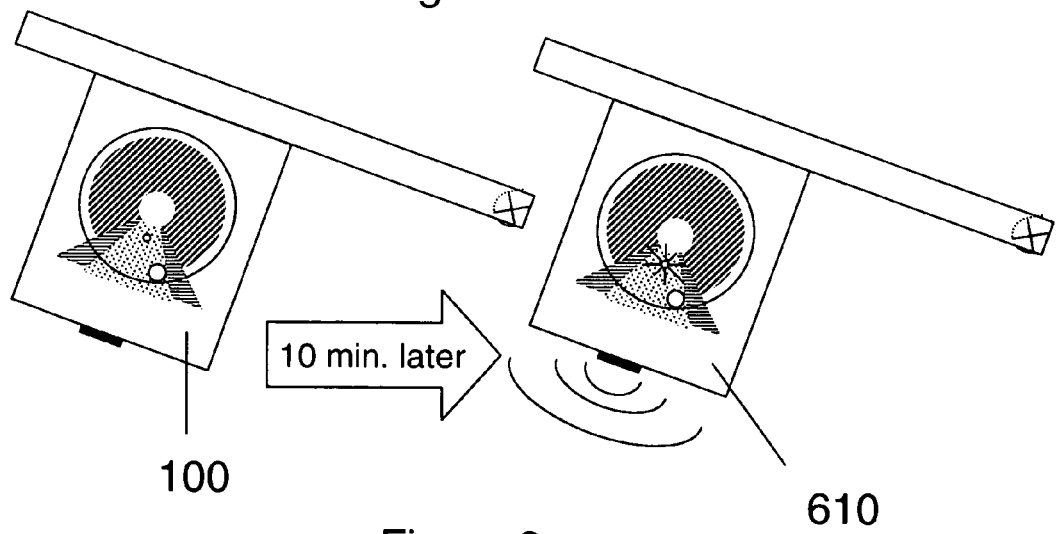
FIG. 6 shows two views of one embodiment of the invention in the form of an inclinometer utilizing a timing device capable of providing a predetermined alarm delay of the indication of the proper or improper elevation of the torso of the patient at risk for aspiration.

Referring to FIG. 6, a sixth embodiment of the invention in the form of the inclinometer utilizing a timing device capable of providing a predetermined delay of the indication of the proper or improper elevation of the torso of the patient at risk for aspiration includes a timer that may have a preset duration that will cause a delay to occur after the bed has been moved out of the proper or improper angular positioning boundaries before the visual or audio annunciator of the unit will activate. Such a delay permits the caregiver adequate time (e.g. 10 minutes) to perform necessary care functions without the disturbance of the annunciator. Typically the unit will have provision of some form of reset function to permit the caregiver a "grace" period to disable the annunciator alarm (e.g. both visual and aural) and permit the caregiver to complete the required patient care before restoring the patient to the elevated position. In FIG. 6, inclinometer 100 has just been positioned at 20 degrees (i.e. dangerous for the patient) and, ten minutes later, activated device 610 is sounding the aural alarm and flashing the indicator light reminding the caregiver to reposition the patient to the appropriate angle. Similar configurations could be applied to the goniometer version. The intent is not to limit the invention to any one type or use of timing device or timing sequence.

Figure 7:
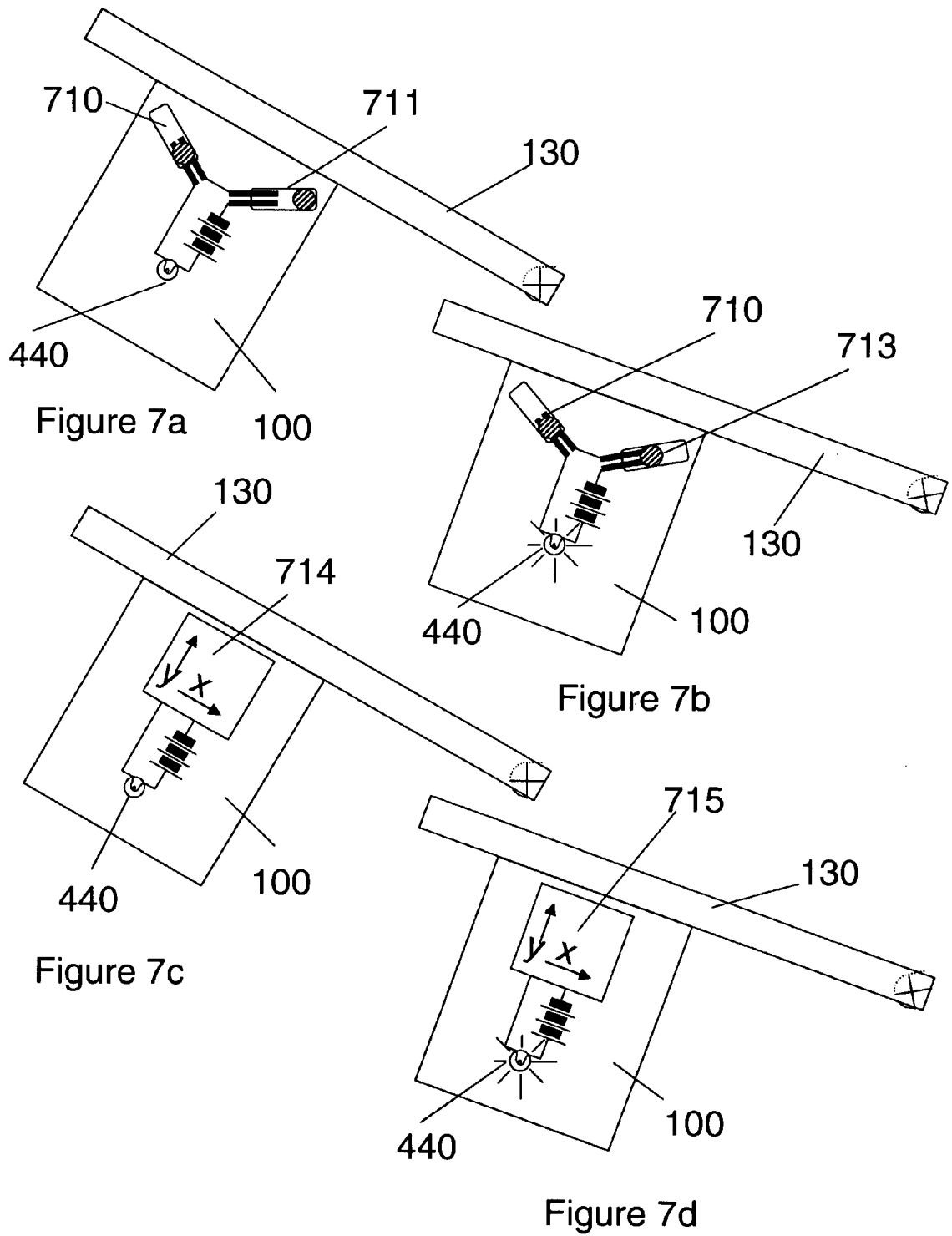
FIGS. 7a-7d show views of two embodiments of the invention in the form of an inclinometer utilizing an electronic or electrical sensor or switch capable of sensing the proper or improper elevation of the torso of the patient at risk for aspiration.

Referring to FIG. 7, a seventh embodiment of the invention in the form of the inclinometer utilizing an electronic or electrical sensor or switch capable of sensing the proper or improper elevation of the torso of the patient at risk for aspiration includes the use of a variety of inclination and angle detection sensors. For example, an inclinometer switch (i.e. a switch responsive to the local gravity field) may consist of a mercury or electrolytic tilt switch, a pendulum switch, a photoelectric, capacitive or magnetic sensed spirit level, a ball switch or any type of switch that is responsive to the local gravity field. The switch is arranged, via a fixed, factory adjustable or user adjustable mount, to switch on (or off) the active components of the annunciator and/or the data recording mechanism once the preset angular limits are exceeded. For example, a mercury tilt switch is arranged such that the mercury ball closes the contacts of the tilt switch while the unit is below 30 degrees. The closing of the tilt switch causes a visual and aural alarm to sound thus indicating to the caregiver that the patient's bed elevation is below 30 degrees and requires attention. Various inclinometer sensors, such as a pendulous sensor utilizing a variable resistive, capacitive, photo optical or magnetic system, an electrolytic sensor, a pendulous servo sensor, an accelerometer (single or two axis), a variable resistive mercury sensor, a resistive, capacitive or magnetic ball sensor or any other type of continuous acting inclinometer sensor can provide the unit and/or data recorder with continuous angular information. Similar configurations could be applied to the goniometer version. Examples of goniometer switches (i.e. a switch responsive to the relative angle between two components) may consist of a limit switch or any type of switch or switch mechanism that is responsive to the relative angle between two components. The goniometer switch is arranged, via a fixed or adjustable mount, to switch on (or off) the active components of the annunciator and/or the data recording mechanism once the preset angular limits are exceeded. For example, a limit switch is arranged such that the limit switch (normally closed) opens the contacts of the limit switch while the unit is above 30 degrees. The closing of the limit switch (i.e. the goniometer is below 30 degrees) causes a visual and aural alarm to sound thus indicating to the caregiver that the patient's bed elevation is below 30 degrees and requires attention. Various goniometer sensors, such as a sensor utilizing a variable resistive, capacitive, photo optical or magnetic system, or any other type of continuous acting goniometer sensor can provide the unit and/or data recorder with continuous angular information. FIG. 7a shows inclinometer 100 with indicator light 440 connected in series with a battery and a mercury tilt switch 710 and a mercury tilt switch 711. Tilt switches 710 and 711 are positioned at +30 degrees and −30 degrees respectively in relation to inclinometer housing 100. Inclinometer 100 is attached to head of bed 130. In FIG. 7a, head of bed 130 is at 30 degrees, hence, the mercury ball in tilt switch 711 is not in contact with the terminals in the switch and has broken the circuit that would otherwise illuminate indicator light 440. In FIG. 7b, head of bed 130 has been lowered to 20 degrees. Notice that the mercury balls in tilt switches 710 and 713 have completed the circuit and indicator 440 is now illuminated thus indicating to the caretaker that head of bed 130 is too low. FIG. 7c shows inclinometer 100 with indicator light 440 connected in series with a battery and MEMS inclinometer module 714. MEMS inclinometer module 714 is positioned normal in relation to inclinometer housing 100. Inclinometer 100 is attached to head of bed 130. In FIG. 7c, head of bed 130 is at 30 degrees, hence, MEMS inclinometer module 714 has broken the circuit that would otherwise illuminate indicator light 440. In FIG. 7d, head of bed 130 has been lowered to 20 degrees. Notice that MEMS inclinometer module 715 has completed the circuit and indicator 440 is now illuminated thus indicating to the caretaker that head of bed 130 is too low. The intent is not to limit the invention to any one type or use of electronic or electrical sensor or switch device.

Figure 8:
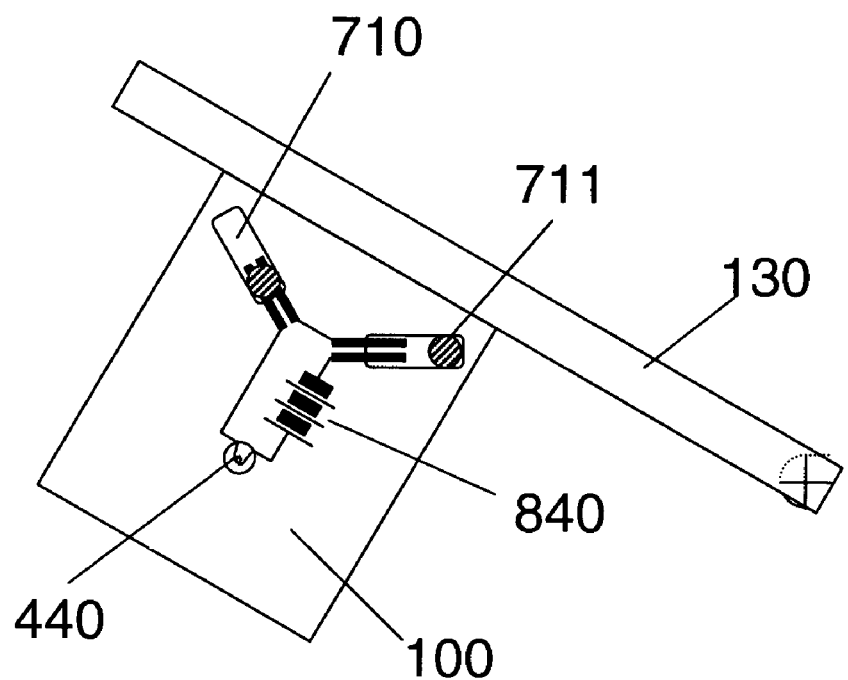
FIG. 8 shows a view of one embodiment of the invention in the form of an inclinometer utilizing an electrical power supply consisting of a cell, battery or capacitor.

Referring to FIG. 8, an eighth embodiment of the invention in the form of the inclinometer utilizing an electrical power supply consisting of a cell, battery or capacitor includes a primary or secondary cell or battery system to provide power to the unit without requiring connection to a mains supply. In addition, a capacitor of the ultra capacitor type could be utilized for a short term power supply. FIG. 8 shows inclinometer 100 with indicator light 440 connected in series with a battery 840 and two mercury tilt switches 710 and 711. Tilt switches 710 and 711 are positioned at +30 degrees and −30 degrees respectively in relation to inclinometer housing 100. Inclinometer 100 is attached to head of bed 130. In FIG. 8, head of bed 130 is at 30 degrees; hence, the mercury ball in tilt switch 711 is not in contact with the terminals in the switch and has broken the circuit that would otherwise illuminate indicator light 440. Similar configurations could be applied to the goniometer version. The intent is not to limit the invention to any one type or use of power supply.

Figure 9:
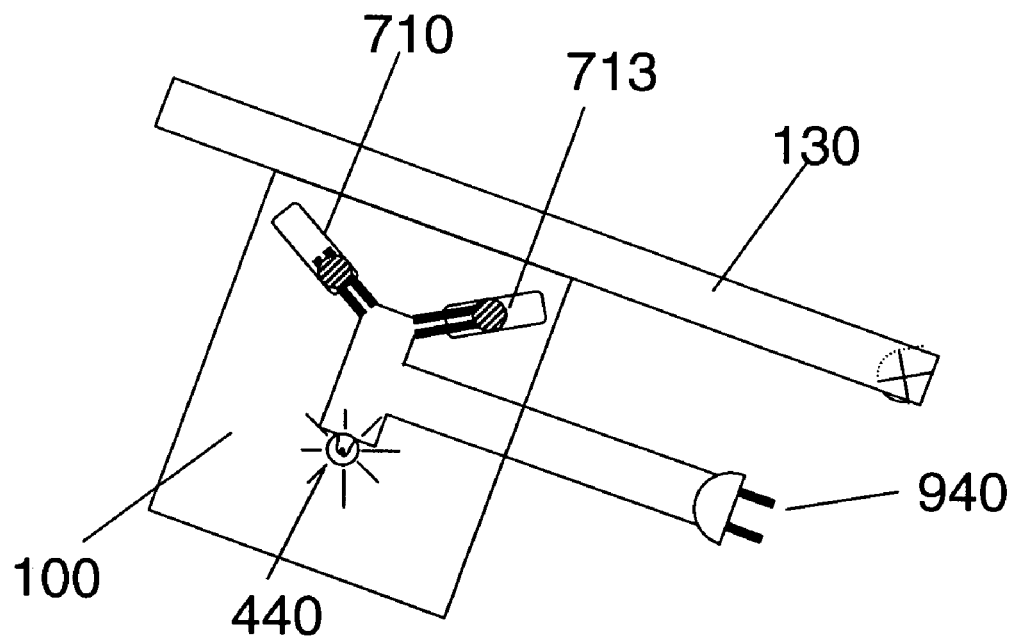
FIG. 9 shows a view of one embodiment of the invention in the form of an inclinometer utilizing an electrical power supply consisting of a of a mains power source.

Referring to FIG. 9, a ninth embodiment of the invention in the form of the inclinometer utilizing an electrical power supply consisting of a mains power source includes a power cord that attaches to a mains outlet. FIG. 9 shows inclinometer 100 with indicator light 440 connected in series with a mains power supply 940 and two mercury tilt switches 710 and 713. Tilt switches 710 and 713 are positioned at +30 degrees and −30 degrees respectively in relation to inclinometer housing 100. Inclinometer 100 is attached to head of bed 130. In FIG. 9, head of bed 130 is at 20 degrees, hence, the mercury ball in tilt switch 713 is in contact with the terminals in the switch and has completed the circuit and illuminates indicator light 440 thus indicating to the caretaker that head of bed 130 is too low. Similar configurations could be applied to the goniometer version. The intent is not to limit the invention to any one type or use of power supply.

Figure 10:
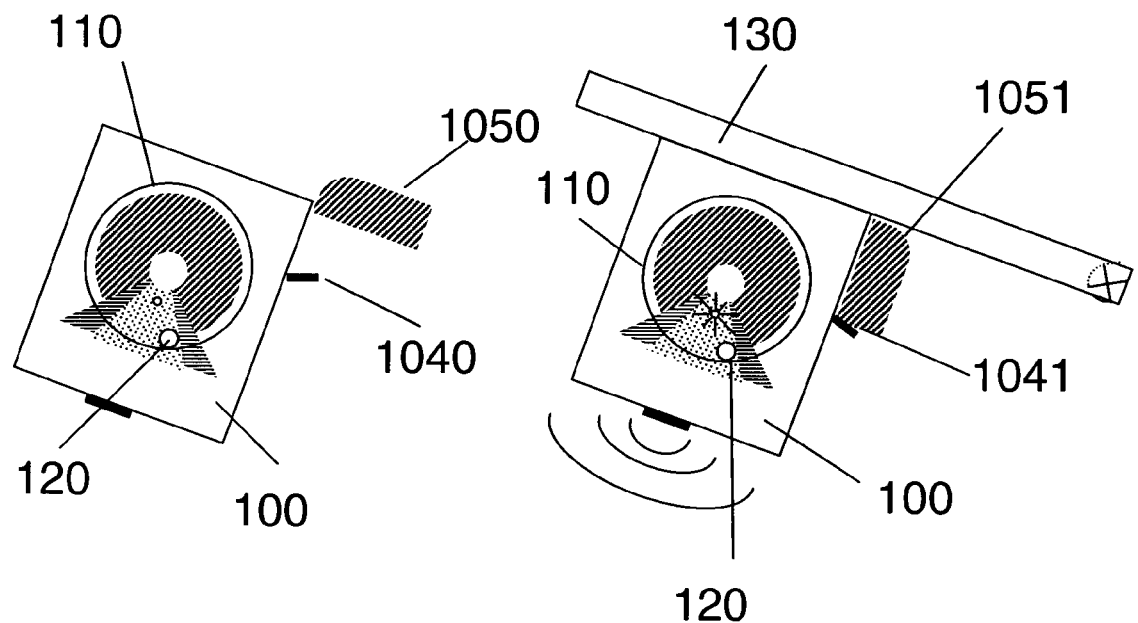
FIG. 10 shows a view of one embodiment of the invention in the form of an inclinometer utilizing an electrical power supply switch system capable of preventing unintentional power down of the device.

Referring to FIG. 10, a tenth embodiment of the invention in the form of the inclinometer utilizing an electrical power supply switch system capable of preventing unintentional power down of the device includes a power supply switch with a protective cover (well known in the art) that prevents the power switch from accidentally being powered off. An additional method of preventing unintentional deactivation of the unit would utilize two momentary switches that must be simultaneously closed to cause the unit to power down. FIG. 10 illustrates two states of inclinometer 100, unattached on the right side of the figure and mounted to head of bed 130 on the left side of the figure. Inclinometer 100 includes previously cited passive and active angle indicators 110 and 120. A power supply toggle switch 1040 is in the "off" position and a spring loaded cover 1050 is in the "open" position. Spring loaded switch cover 1050 is located high enough on inclinometer body 100 such that, when inclinometer 100 is attached to head of bed 130, switch cover 1051 is physically caused to close, thus forcing toggle 1041 to be placed in the "on" position. Placement of switch cover 1051 is such that once the unit is installed on head of bed 130, it is impossible to leave the power switch in the "off" position. Similar configurations could be applied to the goniometer version. The intent is not to limit the invention to any one type or use of electrical power supply switch system capable of preventing unintentional power down of the device.

Figure 11:
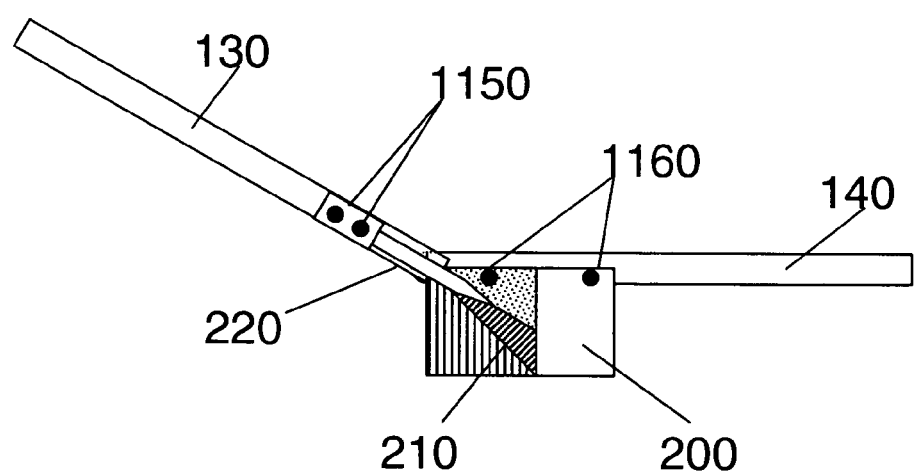
FIG. 11 shows a view of one embodiment of the invention in the form of a goniometer utilizing a permanent system of attachment to the bed.

Referring to FIG. 11, an eleventh embodiment of the invention in the form of the goniometer utilizing a permanent system of attachment to the bed includes fastening the unit to the bed via fasteners, tie wraps, some form of adhesive or other permanent system. In addition, the unit could be built into the bed at the time of manufacture of the bed. The permanent fastening system includes a method of fastening whereby the orientation of the elevating portion of the bed is correctly discerned by the instrument. Goniometer 200 is permanently fastened to the lower portion or foot of bed 140 via fasteners 1160. The bed also has a moveable upper portion or head 130. Angle range indicator 210 in combination with pointer 220 that is permanently fastened to moveable portion of bed 130 via fasteners 1150 indicates the angle of the upper portion of bed 130 and functions as goniometer 200. Similar configurations could be applied to the inclinometer version. The intent is not to limit the invention to any one type or use of permanent fastening system.

Figure 12:
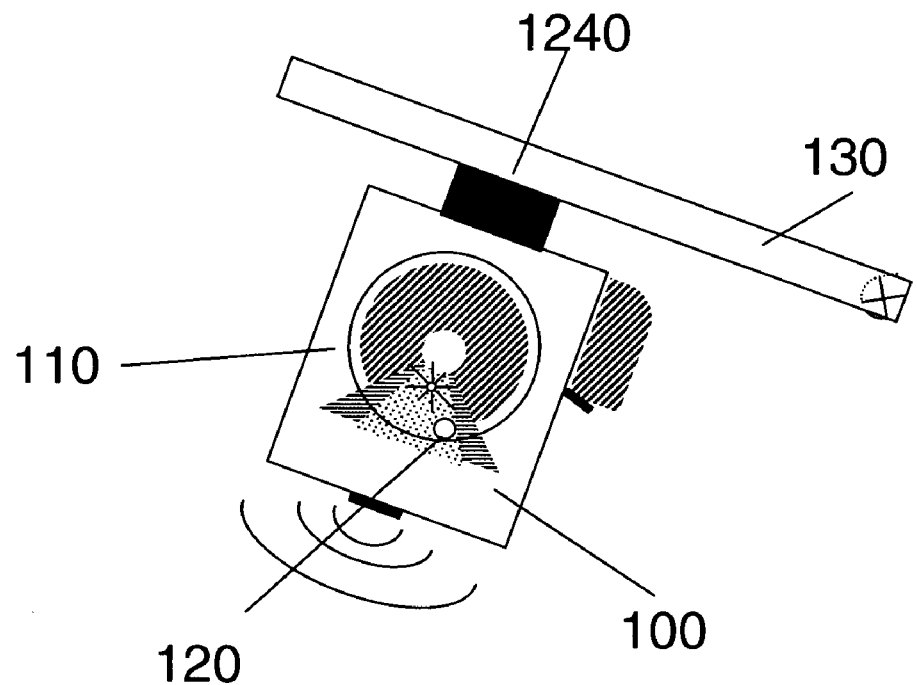
FIG. 12 shows a view of a one embodiment of the invention in the form of an inclinometer utilizing a non-permanent system of attachment to the bed.

Referring to FIG. 12, a twelfth embodiment of the invention in the form of the inclinometer utilizing a non-permanent system of attachment to the bed includes a system to attach to the moveable portion of the bed in any way such as magnetic, hook and loop fastener straps or other removable adhesive. The non-permanent fastening system includes a method of fastening whereby the orientation of the elevating portion of the bed is correctly discerned by the instrument. FIG. 12 shows inclinometer 100 with previously cited indicators 110 and 120. Inclinometer 100 is attached to head of bed 130 utilizing the non-permanent system 1240 in the form of a permanent magnet. Similar configurations could be applied to the goniometer version. The intent is not to limit the invention to any one type or use of non-permanent fastening system.

Figure 13:
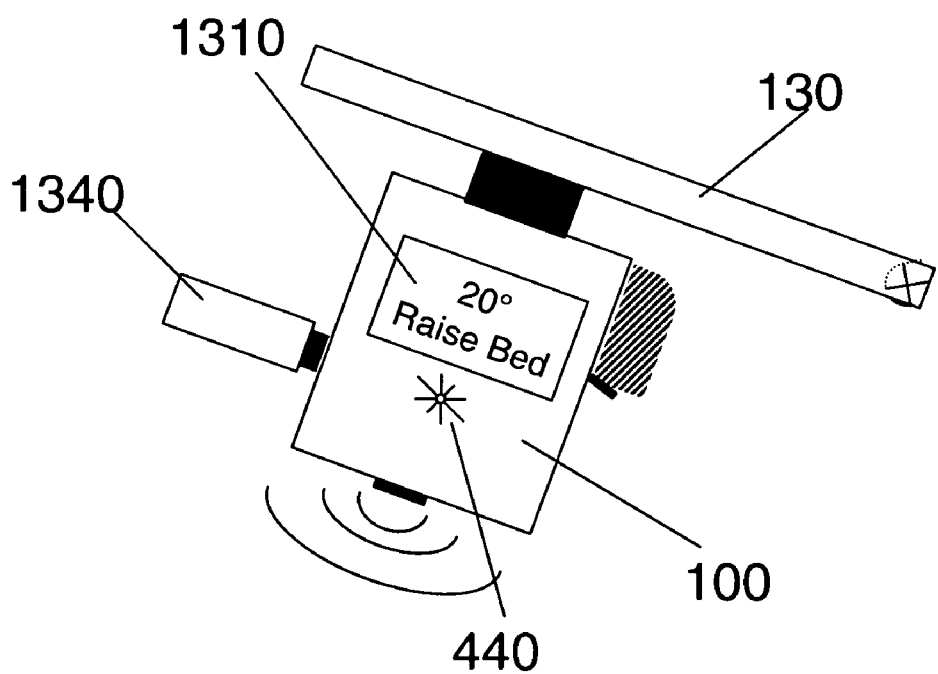
FIG. 13 shows a view of one embodiment of the invention in the form of an inclinometer utilizing a system to record and view data of the elevation state of the bed over a given period of time.

Referring to FIG. 13, a thirteenth embodiment of the invention in the form of the inclinometer utilizing a system to record the elevation state of the bed over a given period of time includes some form of angular sensor capable of measuring the angle of the bed or a go/no go angular compliance switch, some form of clock or timing device, and some form of memory capability such as a magnetic tape drive, volatile computer memory, memory stick or some other memory method (e.g. strip recorder). The information stored in the unit may be viewed on a display located on the unit or via an external computer or monitor. FIG. 13 shows inclinometer 100 with alphanumeric indicator 1310 and flashing lamp 440. Inclinometer 100 is attached to head of bed 130. Angular state information of head of bed 130 is recorded on a removable memory card 1340 and displayed on alphanumeric indicator 1310. The information stored in the memory card 1340 may be viewed on a display located on the unit or via an external computer or monitor. Similar configurations could be applied to the goniometer version. The intent is not to limit the invention to any one type or use of data recording or viewing system.

Referring to FIG. 14, a fourteenth embodiment of the invention in the form of the inclinometer utilizing a system to electronically transfer data to a computer via cable, network, storage media or wirelessly the elevation state of the bed over a given period of time includes connecting the unit to a computer via a cable (e.g. a USB cable) or a wireless system either continuously or intermittently to transfer data to the computer. In addition, the unit may be connected to a computer network via a cable or a wireless system. The computer may contain software to view and evaluate the angle versus time data stored in the unit. FIG. 14 shows inclinometer 100 with alphanumeric indicator 1310 and flashing lamp 440. Inclinometer 100 is attached to head of bed 130. Angular state information of head of bed 130 is transmitted via wireless local area network antenna 1440 and displayed on alphanumeric indicator 1310. The information transmitted via antenna 1440 may be viewed on display 1310 located on the unit or received by wireless local area network receiver 1450, conveyed to external computer 1460, and viewed via monitor 1470. Angular state information 1480 may be conveniently displayed on computer monitor 1470. Similar configurations could be applied to the goniometer version. The intent is not to limit the invention to any one type or use of data transmission system.

Referring to FIG. 15, a fifteenth embodiment of the invention in the form of the inclinometer utilizing a way to place the inclinometer or goniometer on either side of the bed parallel to the long axis of the bed that permits the inclinometer or goniometer to function properly includes an angle sensing system that can be used on either side of the bed. In practice, the inclinometer or goniometer is situated such that the single control face is pointing outward from the side of the bed either to the patient's right or left side. This requires at least two angle sensing units, one situated to sense +30 degrees and one situated to sense −30 degrees since, to mount the unit on either side of the bed, requires that the orientation of the unit relative to the bed be turned 180 degrees to permit viewing of the single control face of the unit. Conversely, the unit can have one angle sensing mechanism set at, say +30 degrees and two "control faces" that will permit viewing of the controls by the user when the unit is placed on either side of the bed. Proper functioning of this type of unit requires that the same faces of the unit (i.e. the faces perpendicular to the control face that are facing the head and foot of the bed) remain oriented to the head and foot of the bed when the unit is placed on either the right or left side of the bed. The preferred embodiment uses only one control face and two angle sensors to prevent confusion of the operator. FIG. 15a shows inclinometer 100 with indicator light 440 connected in series with the battery and two mercury tilt switches 710 and 711. Inclinometer 100 is attached to the right hand side (in relation to the patient) of head of bed 130. Tilt switches 710 and 711 are positioned at +30 degrees and −30 degrees respectively in relation to inclinometer housing 100. Tilt switch 711 is used to sense the angle of head of bed 130 when the unit is placed on the right side of the bed. It is not possible for the ball of mercury in tilt switch 710 to ever break the circuit when inclinometer 100 is on the right side of bed 130 assuming that head of bed 130 is only able to move between 0 and 90 degrees. Note the position of a word "controls" 1521 is oriented properly for caretaker viewing. Head of bed 130 is at 30 degrees; hence, the mercury ball in tilt switch 711 is not in contact with the terminals in the switch and has broken the circuit that would otherwise illuminate indicator light 440. In FIG. 15b, inclinometer 100 has been placed on the left side of bed 130. Notice that inclinometer 100 is turned 180 degrees as compared to the placement on the right side of bed 130. Tilt switches 1512 and 1513 (corresponding to 710 and 711 respectively) are positioned at −30 degrees and +30 degrees respectively in relation to the inclinometer housing 100. Tilt switch 1512 is used to sense the angle of head of bed 130 when the unit is placed on the left side of the bed. It is not possible for the ball of mercury in tilt switch 1513 to ever break the circuit when inclinometer 100 is on the left side of bed 130 assuming that head of bed 130 is only able to move between 0 and 90 degrees. Note the position of the word "controls" 1521 is oriented properly for caretaker viewing. Head of bed 130 is at 30 degrees; hence, the mercury ball in tilt switch 1512 is not in contact with the terminals in the switch and has broken the circuit that would otherwise illuminate indicator light 440. Similar configurations could be applied to the goniometer version. The intent is not to limit the invention to any one type or use of a system to place the inclinometer or goniometer on either side of the bed.

The inventive device could also be used for elevation of other parts of the patient's body, for example, elevation of a broken leg or arm in a traction appliance.

CONCLUSION, RAMIFICATIONS, AND SCOPE

Accordingly, the reader will see that the inclinometer and goniometer configurations of this invention can be used to remind caregivers to reposition and maintain the proper elevation of the patient at risk for aspiration. Furthermore, the invention has the additional advantages in that it provides a form of a passive or active annunciator that solves the problem of reminding the caregiver of the patient at risk for aspiration to maintain or reestablish the elevation of the torso of the patient at risk for aspiration to at least 30 degrees up to 45 degrees above the local horizontal to prevent or reduce the incidence of aspiration.

it provides a form of a passive or active annunciator that attaches directly to a bed without modification to the bed.

it provides a passive or active visual and/or aural indicating device to indicate the proper or improper elevation of the torso of the patient at risk for aspiration.

it provides a timing device capable of providing a predetermined delay of the indication of the proper or improper elevation of the torso of the patient at risk for aspiration.

it provides an electronic or electrical sensor or switch capable of sensing the proper or improper elevation of the torso of the patient at risk for aspiration.

it provides an electrical power supply consisting of a cell, battery, capacitor or mains power source.

it provides an electrical power supply switch system capable of preventing unintentional power down of the device.

it provides a permanent or non-permanent system of attachment to a bed.

it provides a system to record and view on the unit and/or electronically transmits data to a computer via cable, network, storage media or wirelessly the elevation state of the bed over a given period of time.

it provides a system to place the inclinometer or goniometer on either side of a bed parallel to the long axis of the bed that permits the inclinometer or goniometer to function properly.

Although this detailed description has shown and described illustrative embodiments of the invention, this description contemplates a wide range of modifications, changes and substitutions. In some instances, some features of the present invention may be employed without a corresponding use of other features. Accordingly, it is appropriate that the readers should construe the appended claims broadly, and in a manner consistent with the scope of the invention.

We claim:

1. A medical device for indicating that an orientation of a bedridden patient's body falls outside a predetermined angular range for the purpose of reducing complications associated with bedridden patients, comprising:
   an angle range indicator attached parallel to a lower portion of a bed, said angle range indicator displaying an angular range between an upper portion of said bed and said lower portion of said bed;
   a pointer attached parallel to said upper portion of said bed, said pointer indicating an angular measurement difference between said upper portion of said bed and said lower portion of said bed by indicating said angular measurement difference on said angle range indicator;
   a circuit comprising a power supply, said circuit closed upon said pointer reaching an unacceptable angular measurement difference, said circuit for powering an indicating device;
   said angle indicating device powered by said circuit once said circuit is completed by said pointer, said indicating device further indicating that said unacceptable angular measurement has been reached.

2. The device of claim 1 wherein said indicating device comprises an active visual indicating device.

3. The device of claim 1 wherein said indicating device comprises an aural indicating device.

4. The device of claim 1 wherein said indicating device further comprises a time delay device.

5. The device of claim 1 wherein said power supply comprises a battery, capacitor, or other electric power storage medium.

6. The device of claim 1 wherein said device employs a means to operate on both sides of a bed.

7. The device of claim 1 wherein said device is permanently attached to said bed.

8. The device of claim 1 wherein said device is temporarily attached to said bed.

9. The device of claim 1 wherein said indicating device further indicates an unacceptable torso elevation has been reached.

10. The device of claim 1 wherein said indicating device further indicates an unacceptable leg elevation has been reached.

11. The device of claim 1 wherein said indicating device further indicates an unacceptable arm elevation has been reached.

12. The device of claim 1 wherein said angle range indicator is adjustably mounted for adjusting said unacceptable angular measurement difference.

13. The device of claim 1 wherein said device is further associated with a remote indicating device.

14. The device of claim 1 wherein said device further comprises a recording device to record that said unacceptable angular measurement has been reached.

15. The device of claim 1 wherein said device further comprises a switch having a switch cover for preventing unintentional user power down.

* * * * *